United States Patent
Buchheit (10) Patent No.: US 9,273,990 B1
(45) Date of Patent: Mar. 1, 2016

(54) AIRCRAFT REPAIR FIXTURE

(75) Inventor: Jack Gerard Buchheit, Kirkwood, MO (US)

(73) Assignee: The Boeing Company, Chicago, IL (US)

(*) Notice: Subject to any disclaimer, the term of this patent is extended or adjusted under 35 U.S.C. 154(b) by 1044 days.

(21) Appl. No.: 13/327,694

(22) Filed: Dec. 15, 2011

Related U.S. Application Data (60) Provisional application No. 61/533,220, filed on Sep. 11, 2011.

(51) Int. Cl.
*B25B 27/14* (2006.01)
*G01G 21/23* (2006.01)
*B66F 7/14* (2006.01)

(52) U.S. Cl.
CPC . *G01G 21/23* (2013.01); *B66F 7/14* (2013.01)

(58) Field of Classification Search
USPC .......................................................... 29/281.1
See application file for complete search history.

(56) References Cited

U.S. PATENT DOCUMENTS

| | | | | |
|---|---|---|---|---|
| 2,908,472 A * | 10/1959 | McDonald | ........... | B60G 21/106 180/9.5 |
| 3,455,313 A * | 7/1969 | King | ........... | A61H 3/00 135/67 |
| 3,517,677 A * | 6/1970 | Smith | ........... | A61H 3/00 135/67 |
| 3,800,815 A * | 4/1974 | Birk | ........... | A61H 3/00 135/67 |
| 3,816,000 A * | 6/1974 | Fiedler | ........... | G02B 23/14 250/204 |
| 4,018,439 A * | 4/1977 | Kauk | ........... | A63B 69/0022 280/87.041 |
| 4,036,528 A * | 7/1977 | Langendorf | ........... | B60G 9/02 298/17 S |
| 4,077,532 A * | 3/1978 | Bryan | ........... | B60P 1/52 108/55.3 |
| 4,440,265 A * | 4/1984 | Spagnoli | ........... | B66F 7/04 182/129 |
| 4,519,559 A * | 5/1985 | Logan | ........... | B64C 25/52 244/104 FP |
| 4,676,416 A * | 6/1987 | Harmon | ........... | A61H 3/00 135/67 |
| 4,777,973 A * | 10/1988 | Nakajima | ........... | A61H 3/00 135/67 |
| 4,790,079 A * | 12/1988 | Meyers | ........... | G01B 5/25 33/517 |
| 4,793,275 A * | 12/1988 | Usher | ........... | B63C 7/006 114/382 |
| 4,889,202 A * | 12/1989 | Bron | ........... | G01G 21/23 177/134 |
| 5,816,367 A * | 10/1998 | Lilja | ........... | B64F 5/0036 187/244 |
| 5,872,626 A * | 2/1999 | Lipscomb | ........... | G01B 11/26 356/141.3 |
| 6,129,481 A * | 10/2000 | Tapio | ........... | E04G 21/10 404/102 |
| 6,352,236 B1 * | 3/2002 | Aaseth | ........... | B28B 3/022 249/119 |
| 6,378,387 B1 * | 4/2002 | Froom | ........... | G01M 5/0016 73/865.8 |
| 6,953,304 B2 * | 10/2005 | Quenzi | ........... | E01C 19/006 404/114 |
| 7,311,466 B2 * | 12/2007 | Torvinen | ........... | E01C 19/15 404/118 |
| 7,520,800 B2 * | 4/2009 | Duescher | ........... | B24D 11/001 451/527 |
| 7,545,517 B2 * | 6/2009 | Rueb | ........... | B25H 7/00 356/614 |
| 7,837,458 B2 * | 11/2010 | Perret | ........... | B29C 67/0077 264/113 |
| 7,950,675 B1 * | 5/2011 | Quenzi | ........... | B60G 17/02 180/209 |
| 8,138,938 B2 * | 3/2012 | Troy | ........... | G01C 15/00 340/462 |
| 8,562,262 B1 * | 10/2013 | Buchheit | ........... | B23B 35/00 29/402.01 |
| 8,786,867 B2 * | 7/2014 | Matsumoto | ........... | F22B 37/005 250/559.2 |
| 2014/0109944 A1 * | 4/2014 | Triolo | ........... | A61H 3/00 135/67 |

* cited by examiner

*Primary Examiner* — Lee D Wilson
*Assistant Examiner* — Alvin Grant
(74) *Attorney, Agent, or Firm* — Hugh P. Gortler (57) ABSTRACT

A repair fixture for an aircraft portion comprises a frame for supporting the aircraft portion, and rigid variable-length rods having first ends secured to the frame and second ends configured to be firmly secured to the aircraft portion and locked in length.

18 Claims, 7 Drawing Sheets

AIRCRAFT REPAIR FIXTURE

This application claims the benefit of provisional application 61/533,220 filed Sep. 11, 2011.

This invention was made with Government support under contract number FA8202-09-D-0001 awarded by the United States Air Force. The government has certain rights in this invention.

BACKGROUND

Depot-level repair of in-service aircraft may involve removing skin panels and structural members. As but one example of depot-level repair, skin panels and longerons are removed from an aircraft and replaced.

During aircraft repair, an aircraft may be subjected to distortion loads such as sag, bending and twisting. To prevent distortion from occurring, the portion under repair may be secured to a large fixture via turnbuckles. The fixture is mounted to a large concrete slab.

For the most part, the fixture maintains the stiffness of the portion under repair. Still, some distortion loads may be transmitted to the portion due to imprecise adjustment of the turnbuckles. For example, some bending and twisting of a fuselage may occur after longerons are removed.

SUMMARY

According to an embodiment herein, a repair fixture for an aircraft portion comprises a frame for supporting the aircraft portion, and rigid variable-length rods having first ends secured to the frame and second ends configured to be firmly secured to the aircraft portion and locked in length.

According to another embodiment herein, an aircraft repair fixture comprises a frame for maintaining stiffness of an aircraft portion requiring structural repair; feet on an underside of the frame for establishing a plane of the frame; air pads on an underside of the frame for making precise changes to the position of the frame with respect to the aircraft portion; and variable-length, length-lockable rods having first ends secured to the frame and second ends adapted to firmly secure onto tooling details on the aircraft portion.

According to another embodiment herein, an assembly comprises an aircraft fuselage and a repair fixture. The repair fixture includes a frame for supporting the fuselage and rigid variable-length rods having first ends secured to the frame and second ends secured to tooling fixtures on the fuselage to prevent distortion loads from being transmitted between the frame and the fuselage.

These features and functions may be achieved independently in various embodiments or may be combined in other embodiments. Further details of the embodiments can be seen with reference to the following description and drawings.

DETAILED DESCRIPTION

Figure 1:
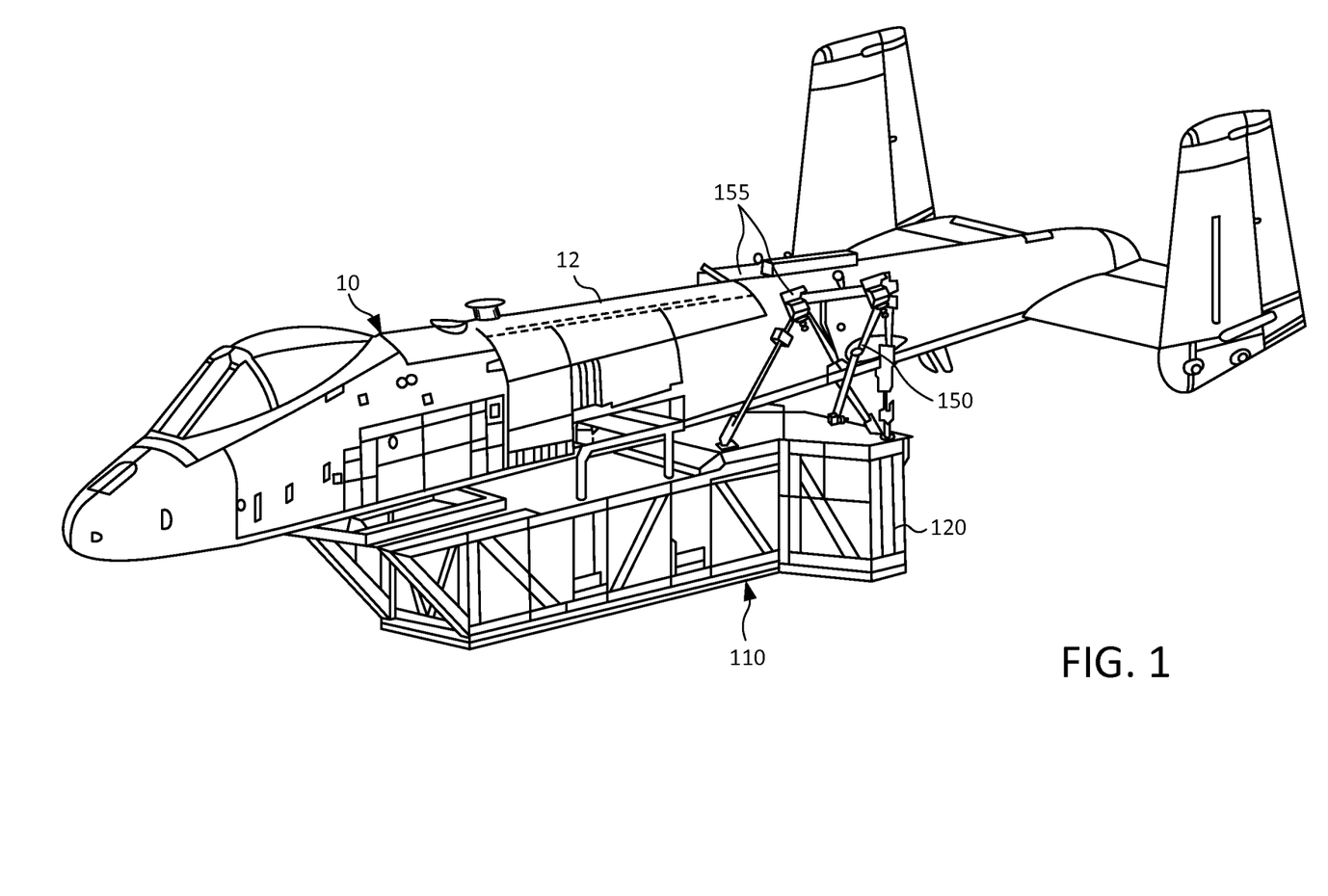
FIG. 1 is an illustration of an aircraft supported by a repair fixture.
Figure 2:
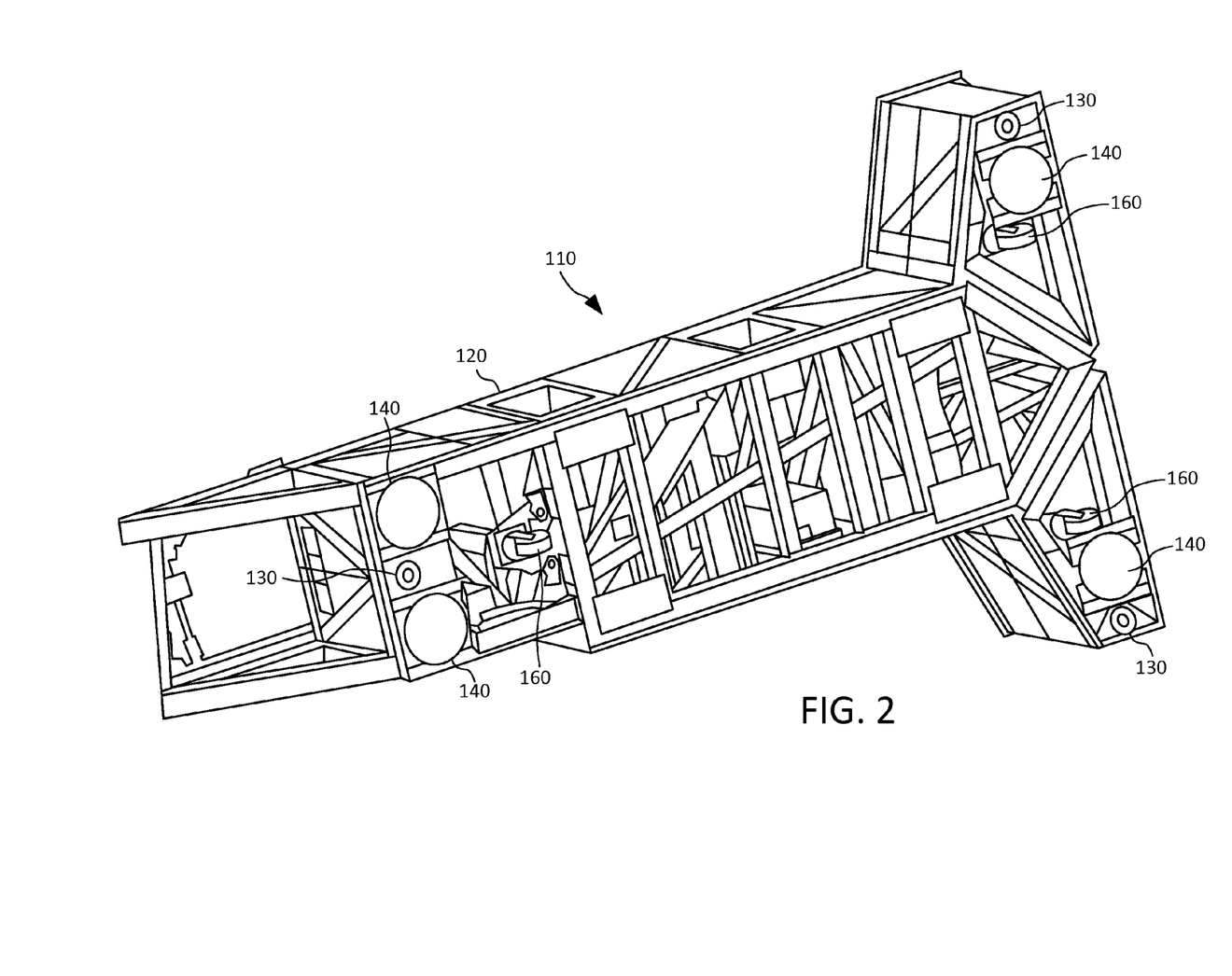
FIG. 2 is an illustration of an underside of the repair fixture.

Reference is made to FIGS. 1 and 2, which illustrate a repair fixture 110 for supporting a portion of an aircraft 10 under repair. In these Figures, the aircraft portion is a fuselage 12. The repair fixture 110 includes a frame 120 for maintaining stiffness of the fuselage 12. The repair fixture 110 is not mounted to a concrete slab or other immovable object. Rather, it is movable on a floor.

The repair fixture 110 includes adjustable feet 130 on an underside of the frame 120. These feet 130 establish a plane for the frame 120, wherever the repair fixture 110 is set down. In some embodiments, the feet 130 are indexed to facilitate height adjustment, and each foot 130 may include a pad that rests on a monoball. If the repair fixture 110 is moved to an uneven surface, the monoball allows the pad to adjust to the uneven surface.

The repair fixture 110 includes air pads 140 on an underside of the frame 120. The air pads 140 are used to make precise changes to the position of the frame 120 with respect to the aircraft 10. The air pads 140 may include bladders that, when inflated, ride on a cushion of air. The air pads 140 enable the repair fixture 110 to be pushed across the floor, even while the fixture 110 is supporting the aircraft 10.

Variable-length rods 150 have first ends secured to the frame 120 and second ends adapted to lock firmly onto tooling details 155, which are attached to stiffening substructure of the fuselage 12. For example, FIG. 1 shows the repair fixture 110 positioned underneath the fuselage 12, with the variable-length rods 150 firmly locked onto tooling details at fore, aft and center portions of the fuselage 12. The rods 150 are locked in length (that is, lengths of the rods 150 are set or fixed).

The repair fixture 110 maintains the stiffness of the portion under repair. The combination of the feet 130, air pads 140 and variable-length rods 150 do a better job than a traditional approach (e.g., conventional fixture, turnbuckles and a concrete slab) with respect to preventing distortion loads from being transmitted to the portion under repair.

Not only is the repair fixture 110 better with respect to distortion loads, it is also movable. If not being used, the repair fixture 110 may be rolled to storage location. Even during repair, the repair fixture 110 and aircraft 10 thereon may be moved to a different location on the floor. Floor space (e.g., for a concrete slab) need not be dedicated. Valuable floor space may be freed up.

Another advantage of a repair fixture herein is that there is no need to hoist the fuselage 12 or other portion under repair. All support is provided from underneath the portion.

Geometry of the frame 120 illustrated in FIGS. 1 and 2 is specific to the portion of the aircraft 10 under repair. Other embodiments of a repair fixture herein may have frames with geometries suited for other aircraft portions and other aircraft.

A method of using the repair fixture 110 will now be described in connection with the repair of the fuselage 12.

Figure 3:
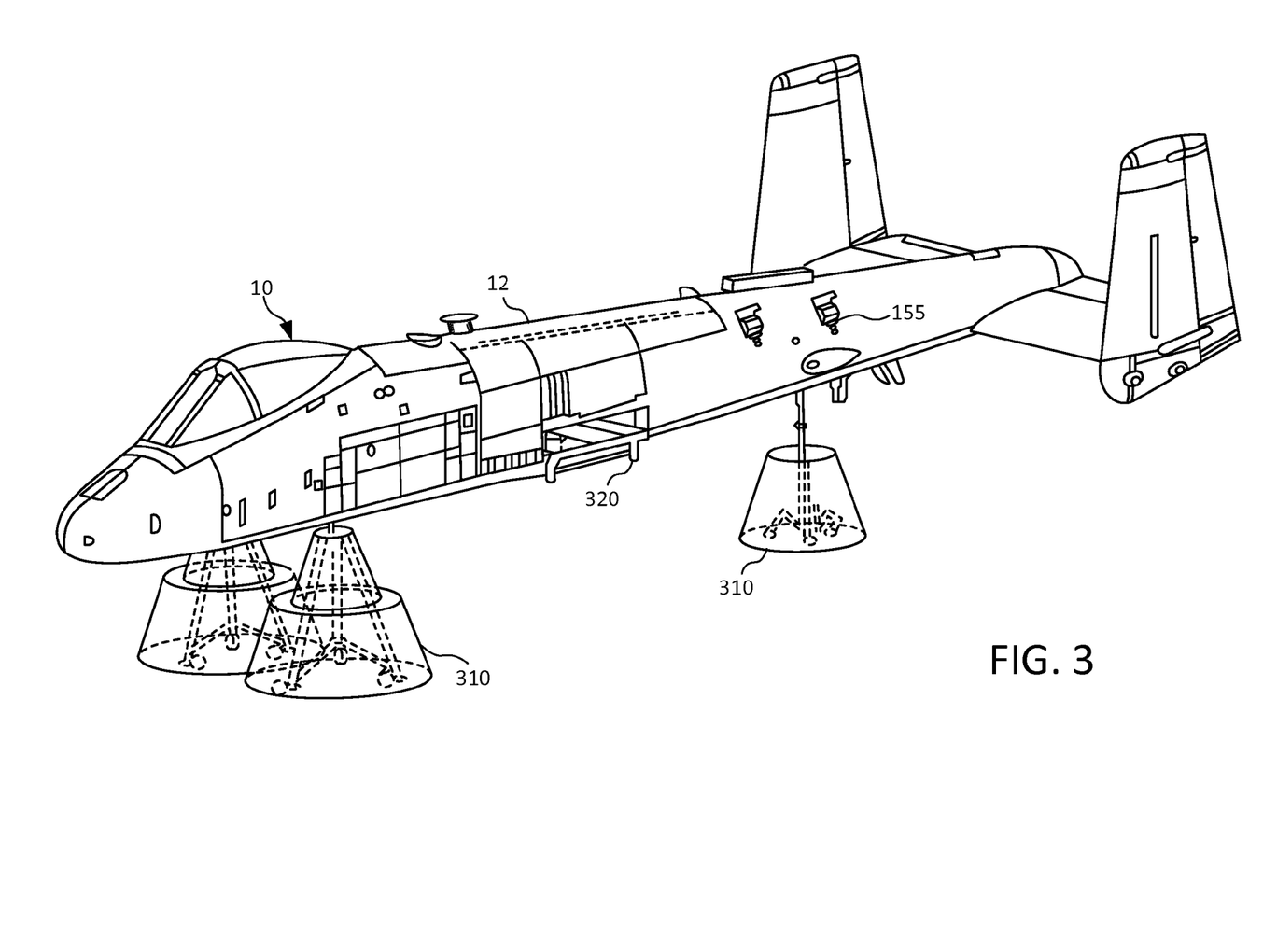
FIG. 3 is an illustration of a de-winged aircraft on jack stands.

Reference is made to FIG. 3. Prior to repair, the aircraft is prepared. For instance, the aircraft 10 is located in a hangar, on jacks 310, with its wings removed. A spreader bar 320 is installed in the fuselage 12 in place of the wings to prevent the fuselage 12 from bending. Fore, aft and center tooling details 155 are installed on the fuselage 12. The tooling details 155 interface with known points and features on the fuselage 12. The tooling details 155 possess adequate load carrying/transmitting ability.

The repair fixture 110 is transported to the hangar. For instance, the repair fixture 110 may be delivered by a truck. The repair fixture 110 is then unloaded from the truck, retractable castors 160 on the underside of the frame 110 are lowered (see FIG. 2), and the repair fixture 110 is rolled next to the aircraft 10.

Fine positioning of the repair fixture 110 is then performed. The air pads 140 are inflated and used to move the repair fixture 110 to a precise position beneath the fuselage 12.

Figure 5:
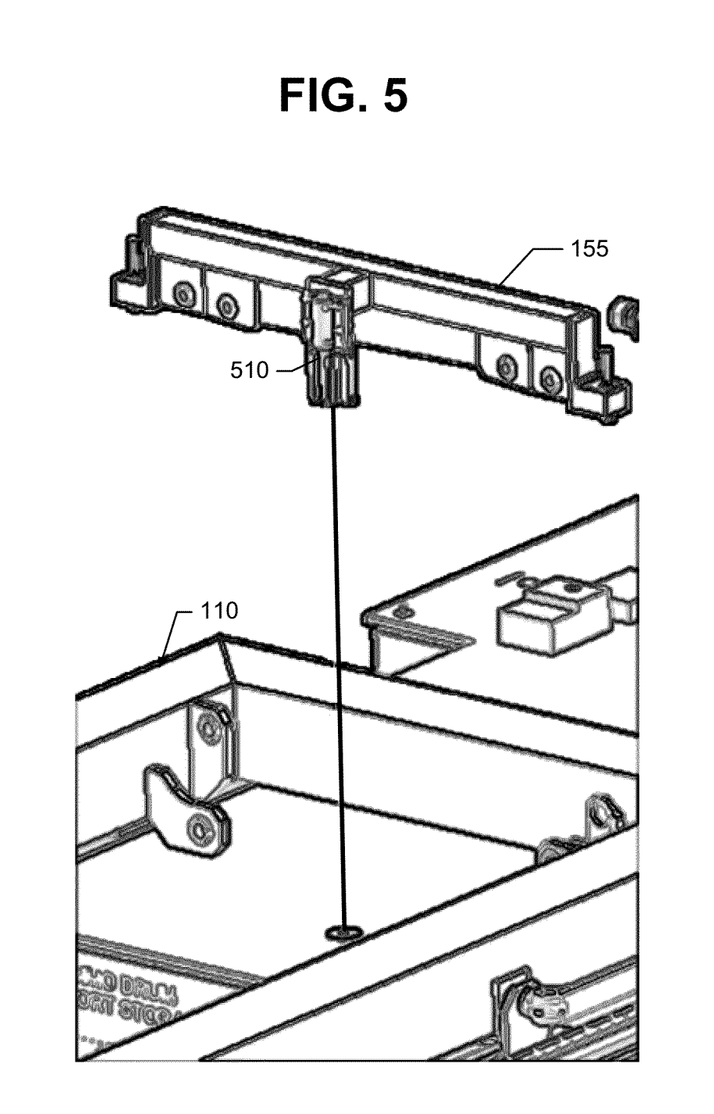
FIG. 5 is an illustration of a laser positioning system for precisely positioning the repair fixture under the fuselage.

As shown in FIG. 5, boresighted laser pointers 510 may be used to precisely locate the repair fixture 110 beneath the fuselage 12. For instance, one laser is precisely mounted on an aft tooling detail 155 and another laser is precisely mounted to a forward tooling detail (not shown). The repair fixture 110 is shifted until beams from the lasers are aligned with markings on the repair fixture 110. (In other embodiments, the boresighting may be performed by other means, such as mechanical means.)

Figure 4:
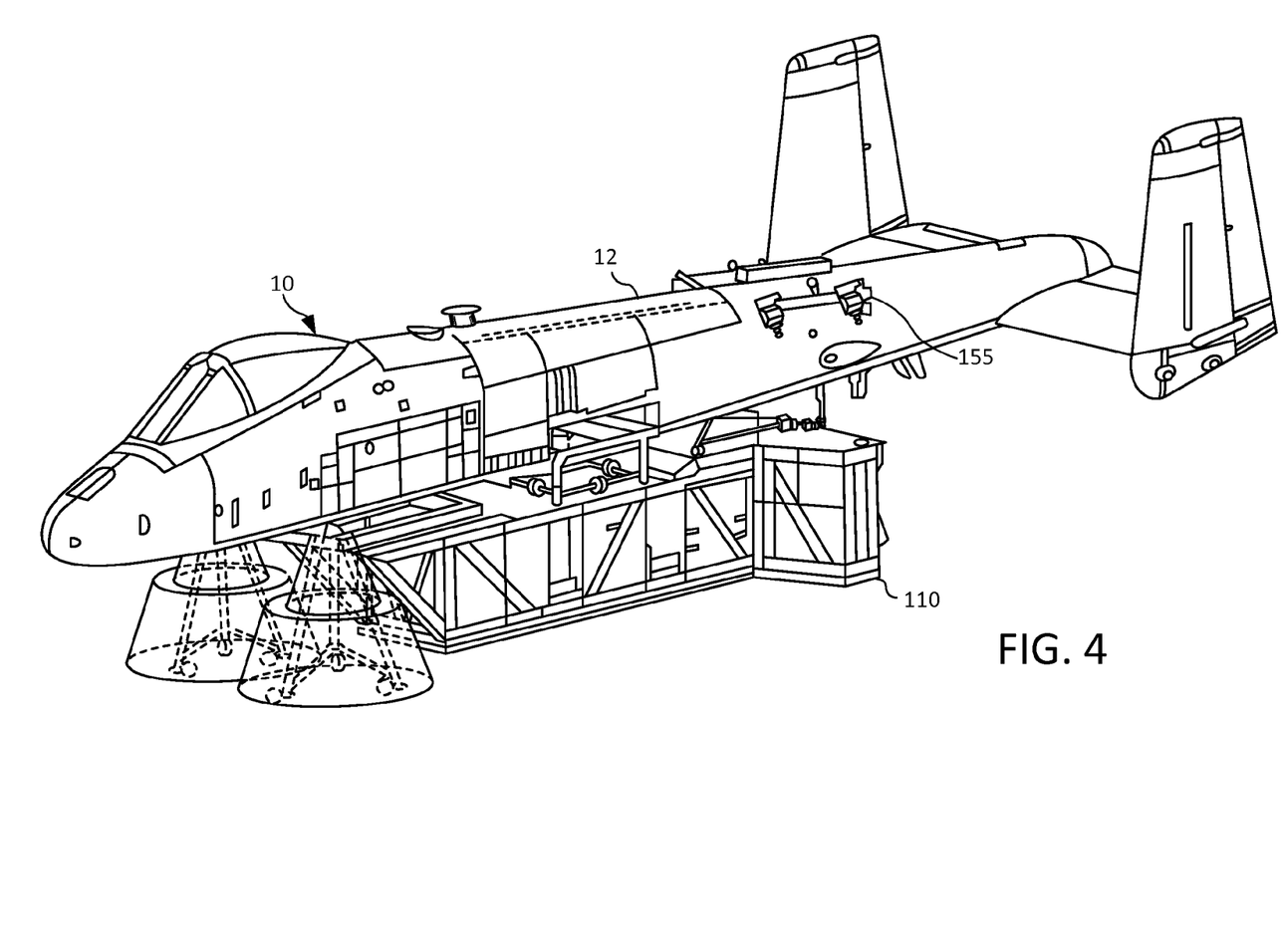
FIG. 4 is an illustration of the repair fixture underneath the aircraft's fuselage.

As shown in FIG. 4, the repair fixture 110 is now in its proper position underneath the aircraft 10. Next, the variable-length rods 150 are extended to the tooling details at fore, aft and center portions of the fuselage 12.

Figure 6A:
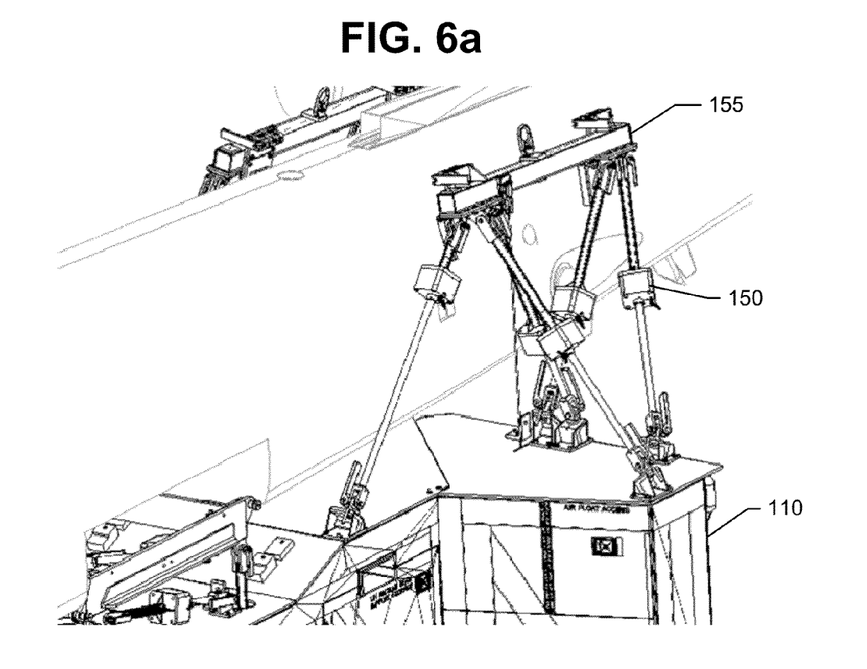
FIGS. 6a and 6b are illustrations of variable-length rods secured to tooling details on the fuselage.
Figure 6B:
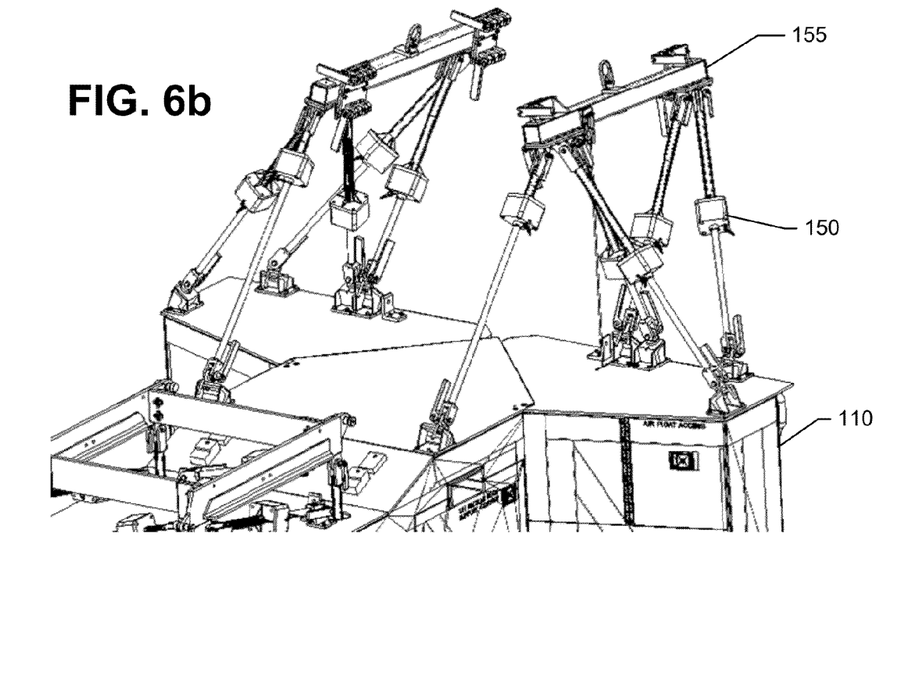

As shown in FIGS. 6a and 6b, free ends of the rods 150 are firmly secured to the tooling details 155, and the lengths of the rods 150 are locked. The fuselage 12 is now secured to the repair fixture 110. At this point, distortion loads are prevented from being transmitted by the rods 150 to the fuselage 12.

Next, the jack stands are removed. Then repair is performed. The repair fixture 110 provides stiffness that prevents the fuselage 12 from being distorted during repair.

If it is desired to move the aircraft 10 during repair, the air pads 140 may be actuated, and the repair fixture 110 with aircraft 10 thereon may be slid to another location on the floor.

The frame 120 may be used to assist with other repair operations. For instance, the frame 120 may assist with the mounting of tooling details and assemblies for operations such as drilling holes and locating parts. The frame 120 may also support scaffolding.

Figure 7:
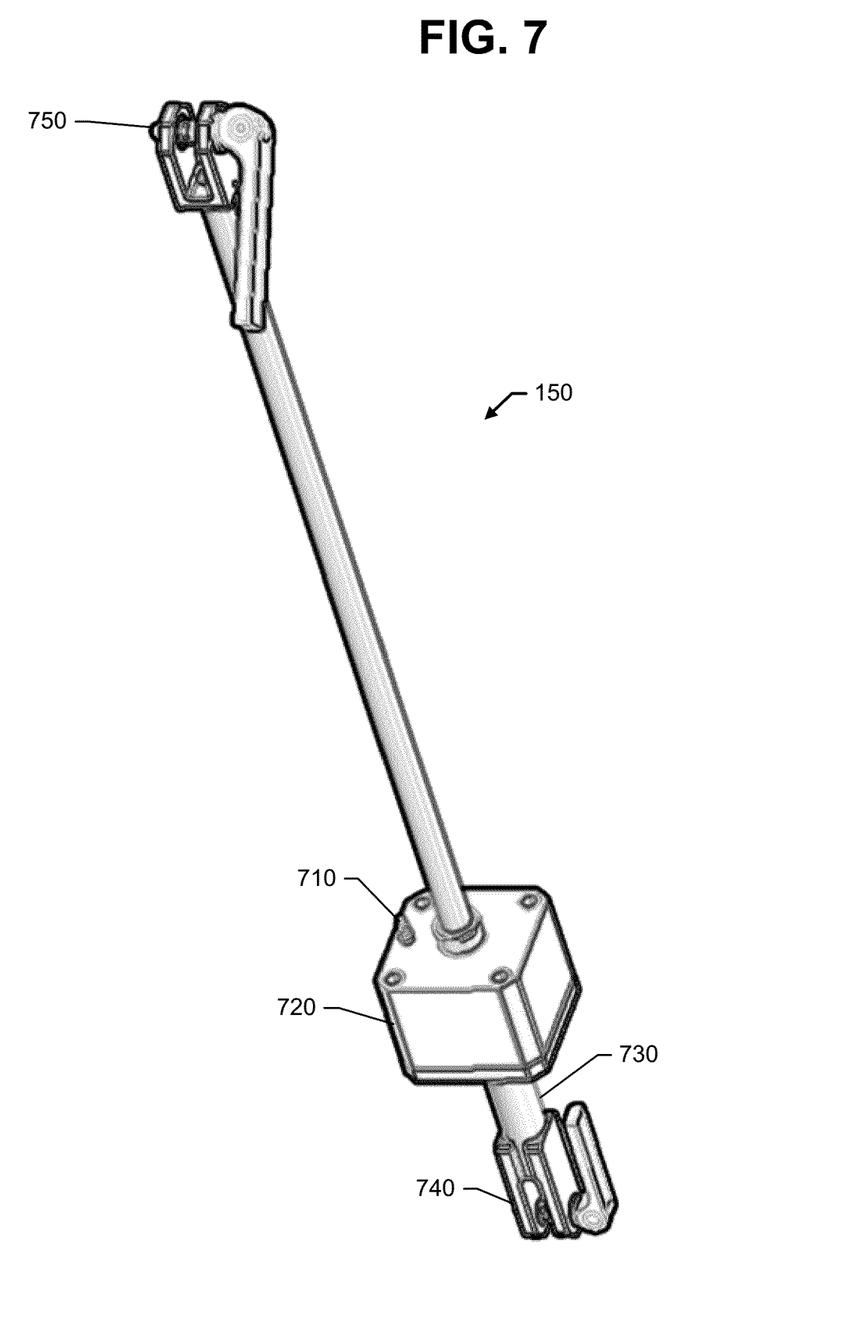
FIG. 7 is an illustration of a variable-length, length-lockable rod.

Reference is made to FIG. 7, which shows an example of a variable-length rod 150. One end of the rod 150 is pinned to the frame 120 (via pin 750). When pressurized air is applied to a fitting 710, a collet within block 720 releases a shaft 730 so the shaft 730 can be extended to its corresponding tool detail. After the shaft 730 has been extended and its free end has been pinned to a tooling detail (via pin 740), the air is removed, whereby the collet locks the position of the shaft 730. The collet is advantageous because it can be locked at any length (as opposed to a rod having notches or holes that lock only at discrete lengths).

A variable-length rod herein is not limited to pneumatic actuation. In other embodiments, a variable-length rod herein may be actuated hydraulically or by some other means.

Although the repair fixture 110 may be used to support a fuselage 12, a repair fixture herein is not limited to the support of fuselages. A repair fixture herein may be configured to support wings, remove skin panels, and perform other operations on an aircraft.

The invention claimed is:

1. A repair fixture for an aircraft portion, the fixture comprising:
   a frame for supporting the aircraft portion;
   rigid variable-length rods having first ends secured to the frame and second ends configured to be firmly secured to the aircraft portion, each rod including a lock for length-locking; and
   means for precisely positioning the frame underneath the aircraft portion while the aircraft portion is held above the fixture.

2. The fixture of claim 1, wherein the frame is mobile and self-leveling.

3. The fixture of claim 1, further comprising a laser boresight system for determining a precise position of the frame beneath the aircraft portion.

4. The fixture of claim 1, wherein the means includes air pads on an underside of the frame for making precise changes to the position of the frame.

5. The fixture of claim 1, further comprising tooling fixtures configured to secure the second ends of the rods to a stiffening substructure of the aircraft portion.

6. The fixture of claim 1, wherein each variable-length rod includes a collet that is actuated to loosen so the rod length can be adjusted and to tighten so the rod length can be locked.

7. A method of operating the repair fixture of claim 6, the method comprising:
   actuating the collets to loosen and allow the rods to extend to tooling detail on the aircraft portion;
   pinning ends of the rods to the tooling details; and
   deactuating the collets to lock lengths of the rods.

8. A method of using the repair fixture of claim 1, the method comprising:
   supporting the aircraft portion on jack stands; and
   precisely positioning the frame underneath the aircraft portion and attaching the second ends to tooling fixtures on the aircraft portion to prevent distortion loads from being transmitted between the frame and the aircraft portion.

9. The method of claim 8, wherein the precise positioning includes sliding the frame on a cushion of air while boresighting the frame with respect to the fuselage.

10. The method of claim 8, further comprising removing the jack stands after the precise positioning and setting down the repair fixture on its feet.

11. The method of claim 10, further comprising inflating air pads bladders to ride on a cushion of air; and pushing the repair fixture across a floor.

12. An aircraft repair fixture comprising:
    a frame for maintaining stiffness of an aircraft portion requiring structural repair; feet on an underside of the frame for establishing a plane of the frame;
    air pads on an underside of the frame that, when inflated support the frame instead the feet; and
    variable-length, length-lockable rods having first ends secured to the frame and second ends adapted to firmly secure onto tooling details on the aircraft portion.

13. The fixture of claim 12, wherein each variable-length rod includes a collet that is actuated to loosen so the rod length can be adjusted and to tighten so the rod length can be fixed at a non-discrete length and location.

14. The fixture of claim 12, further comprising a laser boresight system for determining a precise position of the fixture beneath the aircraft portion.

15. An assembly comprising:
    an aircraft fuselage without wings attached thereto; and
    a repair fixture including a frame for supporting the fuselage and rigid variable-length rods having first ends secured to the frame and second ends secured to tooling fixtures on the fuselage to prevent distortion loads from being transmitted between the frame and the fuselage; and further comprising a spreader bar installed in the fuselage in place of wings.

16. The assembly of claim 15, wherein an underside of the fuselage is in direct contact with the frame.

17. The assembly of claim 15, further comprising a laser boresight system for determining a precise position of the fixture beneath the aircraft fuselage.

18. The assembly of claim 15, wherein each variable-length rod includes a collet that is actuated to loosen so the rod length can be adjusted and to tighten so the rod length can be fixed at a non-discrete length and location.

\* \* \* \* \*